No. 801,875. PATENTED OCT. 17, 1905.
W. W. HOFFMAN.
CLIP FOR EYEGLASSES AND SPECTACLES.
APPLICATION FILED JAN. 26, 1903.
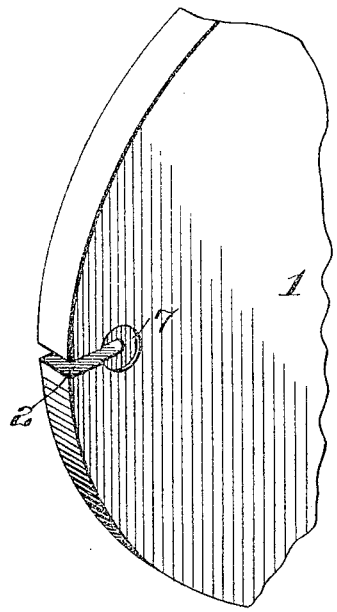
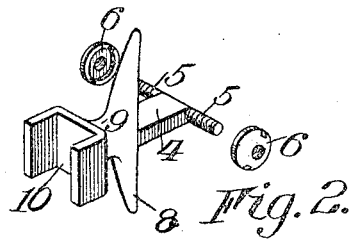
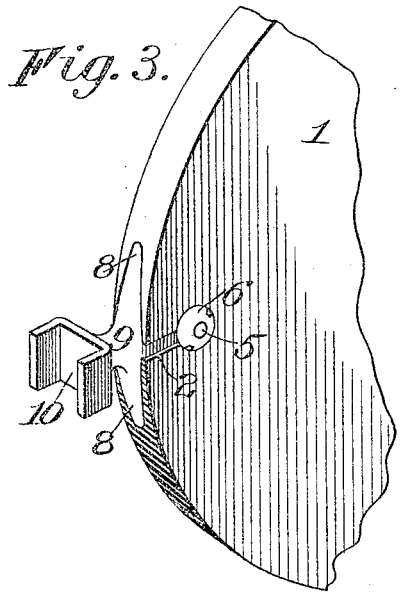
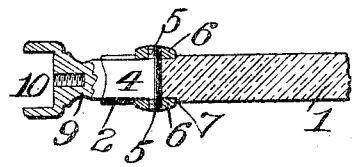
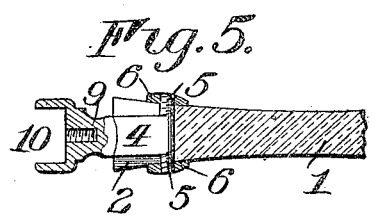
Witnesses
Walter B. Payne
G. Willard Rich
Inventor
William W. Hoffman
By Frederick F. Church
his Attorney

UNITED STATES PATENT OFFICE.

WILLIAM W. HOFFMAN, OF ROCHESTER, NEW YORK, ASSIGNOR TO E. KIRSTEIN SONS COMPANY, OF ROCHESTER, NEW YORK, A CORPORATION OF NEW YORK.

CLIP FOR EYEGLASSES AND SPECTACLES.

No. 801,875.                Specification of Letters Patent.                Patented Oct. 17, 1905.

Application filed January 26, 1903. Serial No. 140,502.

*To all whom it may concern:*

Be it known that I, WILLIAM W. HOFFMAN, of Rochester, in the county of Monroe and State of New York, have invented certain new and useful Improvements in Clips for Eyeglasses and Spectacles; and I do hereby declare the following to be a full, clear, and exact description of the same, reference being had to the accompanying drawings, forming part of this specification, and to the reference-numerals marked thereon.

My present invention relates to eyeglasses and spectacles, and has for its object to provide an improved connection between the lens and the clips to which the temples, bridges, noseguards, or other parts of eyeglasses are attached, whereby not only is a firmer and stronger connection between the lens and other parts secured and the liability of breaking the lenses by lateral strains reduced, but also the amount of metal exposed is less, effecting not only an economy in material, but improving the appearance of the glasses as well; and it consists in the improvements hereinafter described, the novel features being pointed out particularly in the claims at the end of the specification.

In the drawings, Figure 1 is a perspective view of a lens adapted for my improved clip. Fig. 2, a similar view of the clip detached; Fig. 3, a similar view of the lens and clip connected; Fig. 4, a sectional view of the lens and clip, taken in the direction of the length of the latter. Fig. 5 is a similar view of a modification.

Similar reference-numerals in the several figures indicate similar parts.

In carrying out my invention the lens (indicated by 1) is provided with a narrow slot or passage 2, having parallel walls extending inwardly from the edge, as shown in Fig. 1, and being preferably located at about the position occupied by the usual perforation in lenses of this character.

The clip to be applied to the lens is provided with a narrow shank 4, having parallel upper and lower sides or walls and adapted to fit in the slot 2 in the lens and to be secured therein by suitable means, and for this purpose I provide the inner end with lateral-threaded extensions 5, on which are adjustable nuts 6, or, if desired, one of these could be made stationary on one of the extensions and the other adjustable, the particular structure being immaterial so long as the clip is removable and a part adjustable to allow for lenses of different thicknesses. While the frictional contact of the nuts 6 upon the lens will in most instances prevent the disengagement of the clip, I still desire to provide means for holding it so that the clip cannot be accidentally pulled or forced out of the slot. At one or both sides of the lens is provided a slightly depressed or countersunk portion 7, forming shoulders with which the edge of the coöperating nut engages, as shown particularly in Fig. 4. The depression is shown as circular, and this is preferable, as the nut lying therein conceals it; but shoulders on one part and a coöperating projection on the other may be formed in a variety of ways—as, for instance, in a lens having one or both sides concaved, as shown in Fig. 5, the sides diverging toward the edge of the lens to prevent the removal of the clip therefrom without first loosening the nuts.

In order to steady the clip on the lens and to prevent undue strain on the latter, which might tend to break it, I provide the outer portion of the clips with the usual lugs or arms 8, engaging the edge of the lens; but this is not essential, as the shank of the clip coöperating with the walls of the slot is ordinarily sufficient for the purpose. In the particular embodiment of clip shown it is provided with a post or stud 9, having the recessed outer end 10 for the application of an eyeglass-bridge or noseguards; but as the invention is applicable to clips generally for rimless eyeglasses or spectacles, whether to hold the handles, temples, guards, or bridges, the particular structure of the outer part is immaterial.

If desired, more or less elastic washers could be interposed between the securing screws or nuts and the lens to prevent breakage and to secure the parts; but such devices being known in the art it is not deemed necessary to show them.

Clip connections such as shown are light and strong, the parts being so braced that they do not require heavy mountings, and as they present a very small metallic surface at the front and rear are particularly useful in connection with rimless eyeglasses.

Certain changes in the details in construction of devices embodying my invention and to which it appertains will obviously appear to those skilled in the art, and I therefore do not limit myself to the precise construction of the parts as set forth.

I claim as my invention—

1. In a lens-mounting for eyeglasses, the combination with a lens having a slot therein, the walls of which are substantially parallel, of a clip member having a portion resting in said slot, and means resting in the slot and having a portion engaging the surfaces of the lens for securing the clip in position.

2. In a lens-mounting for eyeglasses, the combination with a lens having a slot therein, the walls of which are substantially parallel, of a clip member having a portion resting in said slot and contained within the forward and rear surfaces of the lens, and means engaging the surfaces of the lens at a point removed from its edge for securing the clip in position.

3. In a lens-mounting, the combination with a lens having a slot formed in the edge thereof, the walls of which are substantially parallel, of a clip member having a shank projecting into said slot, and means carried by the clip having a portion projecting from the slot for producing a clamping action upon the forward and rear surfaces of the lens at a point removed from the edge thereof.

4. The combination with a lens having a slot extending from the edge, and a recess in the face at one side of the slot, of a clip member having a shank in said slot, and heads on the clip one engaging the recess in the lens and relatively adjustable to secure the clip to the lens.

5. The combination with a lens having a narrow slot therein and a recess in the face at one side of the slot, of a clip member having a shank arranged in said slot, means engaged in said recess for preventing the movement of the clip laterally of the lens and lugs at the outer end of the clip engaging the edge of the lens on opposite sides of the slot.

6. The combination with a lens having a narrow slot therein, of a clip member having a shank, threaded lateral extensions thereon, and relatively adjustable heads on said extensions engaging the lens to clamp the clip thereto.

7. The combination with the lens having a slot and a shoulder arranged on the face of the lens at one side of the slot, of a clip having a shank adapted to engage in the slot, means for preventing the lateral movement of the clip on the lens and coöperating with the shoulder to prevent the disengagement of the shank from the slot.

8. The combination with a lens having a slot extending from the edge of the lens and provided with depressions on opposite sides, of a clip having a portion engaged in the slot and adjustable heads on the clip engaging the depressions in the lens to prevent movement of the clip thereon.

WILLIAM W. HOFFMAN.

Witnesses:
G. WILLARD RICH,
ELIZABETH J. PERRY.